May 6, 1969 C. LE MEHAUTE ET AL 3,442,774

METHOD OF ELECTRODEPOSITING A MAGNETIC COATING ON A CHAIN-LIKE MEMORY ELEMENT

Filed March 5, 1965

INVENTORS
CHARLES LeMEHAUTE
EDOUARD ROCHER
GUY GUESNIER
ROLAND VAESKEN

BY

Bertram M. Mullin
ATTORNEY

United States Patent Office 3,442,774

Patented May 6, 1969

3,442,774

METHOD OF ELECTRODEPOSITING A MAGNETIC COATING ON A CHAIN-LIKE MEMORY ELEMENT

Charles Le Mehaute, Saint-Laurent-du-Var, Edouard Rocher, Antibes, Guy Guesnier, Saint Avertin, and Roland Vaesken, Viry Chatillan, France, assignors to International Business Machines Corporation, Armonk, N.Y., a corporation of New York Filed Mar. 5, 1965, Ser. No. 456,586

Claims priority, application France, Mar. 9, 1964, 7,357

Int. Cl. C23b 5/50

U.S. Cl. 204—24 2 Claims

ABSTRACT OF THE DISCLOSURE

A process and electrolyte for quiescently electroplating essentially zero magnetostrictive magnetic film on a surface of chain-like geometry wherein the electrolyte contains: nickelous sulfate in a concentration from about 225 to about 275 grams per liter; ferrous sulfate in a concentration from about 3.3 to 4.5 grams per liter; a nickel ion concentration to ferrous ion concentration in the ratio between 50:1 to 80:1, and, sufficient boric acid and acid saccharin to maintain the pH between 2.6 and 3.

This invention relates to magnetic films and, in particular, to the electrodeposition of magnetic thin films for the storage and switching of intelligence.

Both the scientific and academic communities have initiated concerted efforts to study and to develop ferromagnetic thin films for adaptation as parametrons, delay lines, logic devices, and storage elements for computers. Much of this interest originates from the work by M. J. Blois, Jr., who, in 1955, reported that ferromagnetic thin films of 80:20 (by weight) nickel-ion, when evaporated in the presence of a magnetic field, exhibit uniaxial anisotropy. With uniaxial anisotropy, an easy axis of magnetization is available, which is parallel to the direction of the externally applied field, along which are found two stable states corresponding to positive and negative remanence. Furthermore, it has been found these ferromagnetic thin films tend to favor a domain structure that allows rapid rotation of the magnetic remanence from one stable state to the other. Potentially, both engineering and economic advantages are offered over present storage and switching devices used in data processing and computer machines.

Storage and switching of intelligence is achieved by magnetizing a particular element or bit in an array of such elements into either one or the other of its stable states. Rotation of the magnetization remanence takes place upon application of the required switching fields from one stable state to the other in short periods of time in the order of nanoseconds ($10^{-9}$ seconds). Characteristics such as these lend themselves to the applications as heretofore described.

Various techniques are available for producing magnetic thin film devices that exhibit uniaxial anisotropy. These include: vacuum deposition, chemical reduction (electroless deposition), pyrolytic decomposition, cathode sputtering, and electroplating. The first of these processes has received wide attention in the literature. Chemical reduction, or electroless plating, involves the reduction of metal salts, such as those of nickel, iron, and cobalt, with a reducing agent such as hypophosphite ion, on an active or catalytic surface. The pyrolytic technique, a process which has not attracted the interest such as that focused on the others, entails thermally decomposing an appropriate metal organic compound, such as the mixtures of the nickel and iron carbonyl. Cathode sputtering is a process in which atoms are ejected from a target through the impact of ions or atoms and caused to condense on a substrate.

Now, as to the last of these techniques, electroplating is a process for depositing metal on a surface. Traditionally, the surface forms one of two electrodes which are immersed in a solution containing the salts of metals. Upon passage of electric current through the solution, the metal separates from its salt in the form of ions, charged particles. The process depends on existence of these charged particles, that is, these ions, to carry current through the solution and, when the ions come in contact with one of the electrodes of the proper polarity, the ions give up their charge and a deposit or plate is formed about the electrode surface. Compared to the other heretofore mentioned processes, electroplating has several unique advantages. It is an older technology and beter understood than the others, it furnishes better reproducibility of the end product, and potentially offers greater economy than any of the other processes heretofore described.

But, to date, the realization of these advantage as electroplating pertains to the formation of nonmagnetostrictive magnetic films, characterized by bistable properties, accompanied by low coercivities, of the type finding adaptation as storage and switching elements in computers, is still wanting. One of the reasons for this arises from the difficulty in maintaining a constant current distribution over the profile of the surface to receive the magnetic film. The existence of such a distribution is essential in order to maintain uniformity of composition, which, in turn, is a requirement for the production of a non-magnetostrictive magnetic thin film having bistable characteristics. The non-uniformity of current distribution exists on both a macro and micro scale. As to the former, this arises as a result of the cathode profile not being equally distant at all points from the anode. As to the latter, it comes about on a micro scale from the topography or surface roughness on the cathode. Accordingly it has been an object of considerable research, therefore, to overcome these disadvantages of electroplating in order to recognize the inherent advantages for the production of a magnetic film.

Accordingly, it is a primary object of this invention to provide an improved process for electroplating magnetic thin films.

It is a further object of this invention to provide an improved electrolyte for electroplating magnetic thin films.

It is still a further object of this invention to provide an improved process for electroplating essentially zero magnetostrictive magnetic films having bistable characteristics and low coercivities of the type finding adaptation as storage and switching elements in computers.

It is yet another object of this invention to provide a commercially feasible process for electroplating magnetic thin films of the type finding adaptation as computer components.

The foregoing and other objects, features and advantages of the invention will be apparent from the following more particular description of preferred embodiments of the invention as illustrated in the accompanying drawings.

These objects are accomplished in accordance with the invention by immersing the substrate as the cathode in an electrolyte which contains: from about 225 to 275 grams/liter and preferably about 250 grams/liter of nickelous sulfate; from about 3.3 to 4.5 grams/liter and preferably about 4.0 grams/liter of ferrous sulfate, about 25 grams/liter of boric acid; about 0.8 gram/liter saccharin and about 0.4 gram/liter sodium lauryl sulfate. The ratio of the nickel ion concentration to the ferrous ion concentration is kept between 50:1 and 80:1 and preferably at 65:1. The pH is maintained between 2.6 to 3 and preferably at about 2.7 while the temperature of the electrolyte is maintained between 10° to 23° C. and preferably at about 21.5° C. Initially a potential of about 1050 millivolts is applied between the cathode and reference electrode in the electrolyte for a period of about 3 minutes. Thereafter the potential is lowered to about 950 millivolts for a period between 20 minutes to 1 hour in order to obtain an 80:20 nickel-iron (by weight) magnetic film with the desired magnetic characteristics.

Now, since magnetostriction is composition sensitive, and, further, since composition is a function of electroplating parameters, the formation of essentially zero magnetostrictive nickel-iron magnetic thin films requires careful regulation of the electroplating parameters. These parameters include the bath composition, that is, the nature of the salts of the metals to be deposited, addition agents, the bath pH, purity and quality of the products used to prepare the bath, geometry of the electrodes, the current distribution, bath temperature and agitation. However, before proceeding further it is well at this point to offer some definitions as to the terminology used so that the inventive contribution will be placed in proper perspective.

Most ferromagnetic materials when placed in a magnetic field undergo a dimensional change, especially in the direction of the applied field. This phenomenon is called magnetostriction and magnetostriction is designated as positive when the dimension in the direction of the applied field elongates, while magnetostriction is designated as negative if the converse occurs. In a magnetic film, especially where the film is employed as a storage medium, the occurrence of this phenomenon is detrimental. Among the problems encountered are susceptibility to mechanical damage, reduction in available signal output on interrogation, and loss of information.

Figure 4:
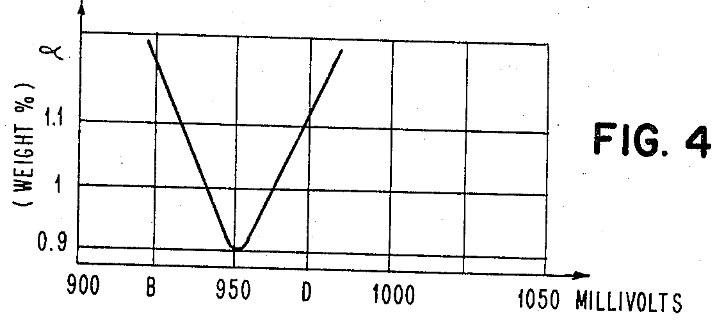
FIG. 4 is a plot of magnetostriction factor ($\alpha$) versus deposition potential.

To evaluate magnetostriction, changes in magnetic properties of the electrodeposits are examined under conditions of mechanical stress. In particular the variation of coercive force of the electrodeposit is evaluated as a function of the relative elongation of the magnetic film. A convenient vehicle for evaluating magnetostriction is with the ratio of the coercive forces at $n$ percent and zero percent elongation ($H_{cn}/H_{co}$) and that ratio is defined as magnetostriction factor $\alpha$. In FIG. 4, the ordinant is in terms of magnetostriction factor $\alpha$ which is defined in the case where $n$ equals 1.

Figure 3:
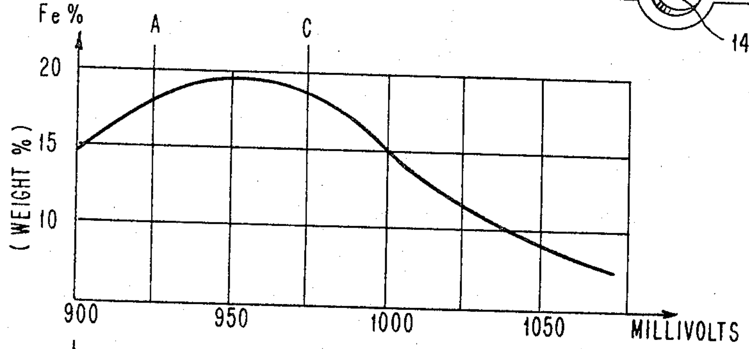
FIG. 3 is a plot of the iron content in the magnetic film versus deposition potential.

Now, with reference to both FIGS. 3 and 4 of the drawings, it will be noted that the iron content in weight percent and $\alpha$ are plotted respectively against electroplating potential. From the available literature and from previous workers in the field, it is well known that essentially zero magnetostrictive compositions of nickel-iron of the permalloy type consist of about 80% nickel and about 20% iron by weight. From what was previously indicated above, $\alpha$ must lie between 0.9 and 1.1 in order to obtain an essentially zero magnetostrictive material. Thus, taking the plots of FIGS. 3 and 4 together, it is evident that the potential required, for producing such an alloy, must lie between lines AB and CD of FIGS. 3 and 4. Thus, the potential needed for electroplating an essentially zero magnetostrictive nickel-iron alloy of the required characteristics lies between 930 and 980 millivolts.

However, before satisfactory results are obtained with the application of a potential between 930 and 980 millivolts, between the cathode and reference electrode, in practice, it is found that it is necessary to apply a potential between the cathode and reference electrode of up to a magnitude of 1050 millivolts for a few minutes before applying the electroplating voltage. What this accomplishes, that is, the brief over-voltage, is to depassivate the cathode surface, which passivation arises from superficial oxidation or from the absorption of products contained in the electrolytic bath. Additionally, the brief over-voltage furnishes nucleating sites for the reception of the nickel-iron essentially zero magnetostrictive film.

Further, along with using a brief over-voltage for depassivating the cathode surface and supplying nucleating sites, and maintaining the electroplating potential between 930 and 980 millivolts, it is important that the potential remain essentially constant. The composition of the resultant electrodeposit and its magnetic characteristics are strongly governed by the degree to which the potential is maintained constant. But, since the actual cathode area is undergoing change as plating material is placed thereon, it becomes difficult to measure the area of the cathode. It has been found that maintaining the plating voltage constant provides a uniform current density to the cathode and yields reproducible essentially zero magnetostrictive deposits. It has also been found that to keep magnetostriction within permissible limits, the deposition potential must not be allowed to vary more than ±12 millivolts from the nominal value. This is accomplished with the use of a potentostat which instruments are well known in the art and provide control of the voltage within ±1 millivolt.

Figure 2:
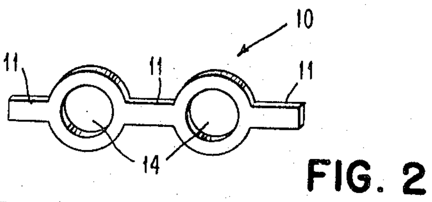
FIG. 2 is an isometric diagram of the substrate utilized in the electroplating of a magnetic film in accordance with the present invention.

Now, along with the regulation of the plating parameters heretofore described, it is also of paramount importance to avoid stirring or agitation of the electrolyte during electroplating, especially where the substrate is of an intricate geometry, especially such as that shown in FIG. 2. If stirring or agitation of the electrolyte occurs during electroplating, turbulence may occur about the radial portions of the device 10 shown in FIG. 2 which results in a nonhomogeneous and nonuniform deposit of material.

To further bring the invention into proper perspective, a specific example of a storage film formed on a substrate such as that depicted in FIG. 2 is hereafter described. The description is intended as an illustration to assist in the appreciation of the inventive contribution and is not intended as a limitation to the specific details whact are hereafter given.

FIG. 2 shows several elements 10 of a chain-like configuration which forms the substrate for the electroplating process in accordance with the invention. Elements 10 are conductive strips which include toroidal or elliptically shaped portions 14 which are electrically coupled by neck portions 11. The toroidal or elliptically shaped portions 14 form storage units for the retention of intelligence. A more detailed discussion regarding the use of such storage elements is described in U.S. Patent applications Ser. No. 322,588 to Hans-Otto G. Leilich, filed Dec. 23, 1963 and Ser. No. 332,746 to John L. Anderson et al., filed Dec. 23, 1963, both of which applications are assigned to the assignee of the instant invention. Of course it will be recognized that although only two storage units are shown in this chain-like configuration, it will be understood that many such units may form part of one chain-like substrate during the electroplating process.

Such a substrate is preferably formed from two ounce (0.0028 inch in thickness) rolled copper. Such a substrate may typically have an over-all length of about 40 mils and the toroidal or elliptical portion an outer diameter of about 20 mils and an inner diameter of about 12 mils.

The surface condition of the substrate material has a marked influence on the electrodeposit orientation. In fact, the direction of the easy magnetization (111) tends to orient itself parallel with the surface defects. Manufacturing techniques for the metallic substrates, such as rolling, drawing, and the like, tend to promote preferred directions for surface defects. This tendency for orientation of the electrodeposit in the direction of the surface defects is very strong even in the presence of external orienting fields about the electroplating equipment. Thus, to be in a position to control the direction of easy magnetization, and obtain the desired magnetic properties of the resultant electrodeposit, it is necessary to eliminate the oriented defects.

To recognize this, copper foil is initially treated in an aqueous solution of hydrochloric acid and cupric chloride (60 g./l. of $CuCl_2$ in 300 ml./l. of HCl) for about 30 seconds. The cleaned foil is then placed in an electrolyte containing:

phosphoric acid ($d$=1.71) 1000 cc.,
$H_2O$ (demineralized), 820 cc.,
Final density of solution, 1.39,
Cathode stainless steel.

The substrate plays the part of the anode in the electrolyte. A voltage of about 0.4 volt is applied for a period of about 2 minutes. The anode surface becomes covered with a red oxide film. The voltage is gradually increased until about 2 volts for another 2.5 minutes. The substrate is then removed from the electrolyte and the red oxide is easily removed from the copper substrate.

The copper foil is cleaned in a 10% solution of hydrochloric acid, then rinsed with water and dried. Conventional photoresist is applied and the material is then exposed with positive art work to a xenon arc lamp or equivalent light source for a few seconds. The material is then etched in 30° Bé. ferric chloride, immersed in a photographic fixer, and the required chain-like structure developed according to standard techniques.

Figure 1:
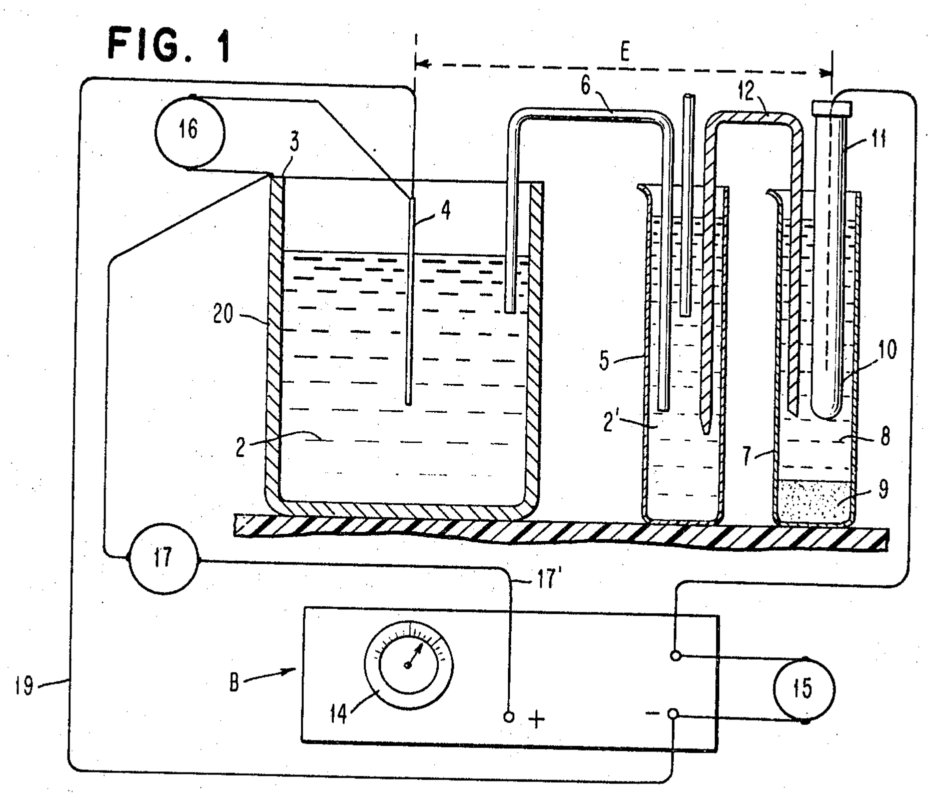
FIG. 1 is a vertical section of the apparatus used in the electroplating of a magnetic film in accordance with the present invention.

The chain-like configuration is now mounted as cathode 4 in tank 20 as shown in FIG. 1. Tank 20 holds the bath (electrolyte) 2. One wall of tank 20 is inert anode 3 such as platinized tantalum. Adjacent to tank 20 is reservoir 5 which holds bath 2′, identical with bath 2, and which is coupled to container 20 by way of conduit 6 which is in the form of a syphon. Adjacent to reservoir 5 is a second reservoir 7 which contains a saturated solution of potassium chloride 8, the undissolved crystals of which are represented by 9. Porous tube 10 holding a saturated solution of calomel is positioned in reservoir 7. Reservoir 7 is coupled to reservoir 5 by way of glass tube 12 filled with gelatin that is saturated with potassium chloride. Anode 3 is coupled to power source 13 by way of line 17′. Cathode 4 is similarly coupled to the opposite pole of source 13 by way of line 19. A suitable electronic circuit of the type which is well known in the art permits voltage E, between cathode 4 and calomel electrode 11 (reference electrode) to remain at a predetermined constant value, which value is displayed by meter 14. The electroplating apparatus is completed by including volt meter 15 for measuring the regulated voltage, volt meter 16 which measures the voltage between the anode 3 and cathode 4 and the ammeter 17 for measuring the electrolytic current In this manner a constant potential E is maintained between the cathode and reference electrode which provides a constant current density during the electroplating operation.

Now, for example, in the electrodeposition of an essentially zero magnetostrictive nickel-iron film of 80:20 composition, the cathode is inserted as indicated in FIG. 1. Bath temperature is maintained at about 21.5° C. and stirring or agitation of the bath is avoided for the reasons heretofore given. The pH is maintained at 3, for it is found that oxidation of the ferrous salts occurs at higher pH's. A preferred composition for the bath 2 (electrolyte) contains 250 grams/liter of nickelous sulfate ($NiSO_4 \cdot 7H_2O$); 4 grams/liter of iron sulfate $$(FeSO_4 \cdot 7H_2O)$$

25 grams/liter boric acid ($H_3BO_3$); about 0.8 gram/liter saccharin ($C_6H_4CONHSO_2$); a nickel to ferrous ion ratio of about 65:1, and about 0.42 gram/liter of sodium lauryl sulfate which acts as a wetting agent. The electrodeposition voltage is initially fixed at 1020 millivolts for 3 minutes and thereafter lowered to 940 millivolts during the rest of the operation. This operation lasts for about 20 minutes to an hour according to the characteristics desired. This results in magnetic films of essentially zero magnetostriction with bistable characteristics and low coercivities with thicknesses between 10,000 to 50,000 A.

Additional examples of electrolyte solutions and their operating conditions are given in the table below.

TABLE

| $NiSO_4 \cdot 7H_2O$ (g./l.) | $FeSO_4 \cdot 7H_2O$ (g./l.) | Temp. (° C.) | E (mv.) | io(ma./cm.²) |
|---|---|---|---|---|
| 250 | 4 | 21.5 | 950 | 5 |
| 250 | 4.5 | 23 | 950 | 9 |
| 260 | 3.3 | 10 | 950 | 5 |
| 275 | 4 | 21 | 950 | 7.5 |
| 225 | 4 | 21.5 | 950 | 4 |

The data presented in the table above provides electrodeposits with a magnetostriction factor (α) between 0.9 and 1.1. The electrolyte contains, in addition to that indicated, boric acid of about 25 grams/liter, saccharin of about 0.8 gram/liter, sodium lauryl sulfate of about 0.4 gram/liter, and the pH maintained at 2.7. Both the nickelous and ferrous sulfates are presented in grams/liter. The third column presents temperatures in degrees centigrade. In the fourth column, the voltage applied between the reference electrode and the substrate is presented in millivolts, while the last column presents current density (io) in milliamperes per square centimeter. From the table it is evident that the nickelous sulfate may lie between 225 to 275 grams/liter and the ferrous sulfate between 3.3 grams/liter to 4.5 grams/liter and that the temperature may vary between 10° to 23° C. From FIGS. 3 and 4 it is evident that the potential between the reference electrode and substrate may vary between 930 to 980 millivolts (following a strike voltage of about 1050 millivolts for a few minutes).

As heretofore mentioned, it is important to avoid agitation or stirring of the electrolyte during the electroplating process for, as previously indicated, nonuniform and nonhomogeneous deposits result. In addition, it has been found that the magnetic characteristics are extremely sensitive to even slight impurities. Accordingly, it is advisable to employ demineralized water in the electrolyte in order to avoid adding stress type ingredients. Also, stresses are further minimized with the salts of the nickelous and ferrous sulfates as compared to the sulphamates or chlorides or the like. With salts other than the sulfates, hydrogen tends to remain at the cathode, forming small bubbles, and as the deposit builds up, the bubbles tend to be come entrapped resulting in a porous magnetic film. Also, it has been suprisingly found that it is extremely important that the stress reducers, that is, the saccharin, that is added to the electrolyte, be of the acid type. This further enables the minimization of parasitic elements in the bath. Of course, as previously mentioned, it is advisable to use sodium lauryl sulfate as the wetting agent and boric acid as the buffer to maintain the pH within the required limits.

What has been described is an electroplating process for producing essentially zero magnetostrictive magnetic films on substrates of intricate geometries. Of course it will be readily recognized by those skilled in the art that although FIG. 1 does not show external coils for inducing a preferred magnetic direction in the resulting electrodeposit, that such coils are readily adapted for such a purpose in the electroplating process, and that such a field is usable where particular anisotropy directions are desired in the magnetic film. The particular proportions, ingredients and parameters involved in the formation of a magnetic film of essentially zero magnetostriction of the type required for the storage and switching of intelligence are extremely sensitive. Conditions required to obtain stress insensitive magnetic nickel-iron deposits require careful regulation of the plating parameters.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A process for quiescently electroplating from an aqueous solution an essentially zero magnetostrictive magnetic film having an magnetostriction factor between 0.9 and 1.1 and having bistable characteristics of the type finding adaptation as a storage and switching device in a computer comprising:

forming a metallic substrate having a chain-like geometry;

inserting said substrate as a catode in an aqueous electrolyte solution consisting essentially of nickelous sulfate in the concentration from about 225 to about 275 grams/liter, ferrous sulfate in the concentration from about 3.3 to about 4.5 grams/liter, wherein the nickel ion concentration to ferrous ion concentration is maintained between 50:1 to 80:1 and further wherein sufficient boric acid and acid saccharin is included to maintain the pH of said electrolyte between 2.6 and 3;

maintaining said aqueous electrolyte solution in a quiescent state;

maintaining said electrolyte at a temperature between 10 to 23° C.;

applying a potential between said cathode and a reference electrode of a magnitude of about 1050 millivolts for a brief period to depassivate the surface of said cathode and provide nucleating sites for the magnetic film ions and, thereafter;

lowering the value of said potential to a value between 930 and 980 millivolts and maintaining said potential between said cathode and reference electrode until the magnetic film forms on the surface of said cathode.

2. A process for quiescently electroplating from an aqueous solution an essentially zero magnetostrictive magnetic film having a magnetostriction factor between 0.9 and 1.1 and having bistable characteristics of the type finding adaptation as a storage and switching device in a computer comprising:

forming a metallic substrate having a chain-like geometry;

inserting said substrate as a cathode in an aqueous electrolyte solution consisting essentially of nickelous sulfate in the concentration of about 250 grams/liter, ferrous sulfate in the concentration of about 4 grams/liter, wherein the nickel ion concentration to ferrous ion concentration is maintained at about 65:1 and further wherein sufficient boric acid and acid saccharin is included to maintain the pH of said electrolyte at about 2.7;

maintaining said aqueous electrolyte solution in a quiescent state;

maintaining said electrolyte at a temperature of about 21.5° C.;

applying a potential between said cathode and a reference electrode of a magnitude of about 1050 millivolts for a brief period to depassivate the surface of said cathode and provide nucleating sites for the magnetic film ions and, thereafter;

lowering the value of said potential to about 950 millivolts and maintaining said potential between said cathode and reference electrode until the magnetic film forms on the surface of said cathode.

References Cited

UNITED STATES PATENTS

| | | | |
|---|---|---|---|
| 3,141,837 | 7/1964 | Edelman | 204—43 |
| 3,378,821 | 4/1968 | Leilich | 340—174 |
| 3,027,309 | 3/1962 | Stephen | 204—43 |
| 3,047,475 | 7/1962 | Hespenheide | 204—43 |
| 3,119,753 | 1/1964 | Mathias et al. | 204—43 |
| 3,148,358 | 9/1964 | Synder | 340—174 |

OTHER REFERENCES

Gray, A.G.: "Modern Electroplating," pp. 90–93, 1953.

Wolf, I.W. et al.: "Nickel-Iron Electrodeposits for Magnetic Shielding," Tech. Proc. Amer. Electroplaters Soc., vol. 43, pp. 215–218, 1956.

Anderson, J. L.: "Cross Core Memory Construction," I.B.M. Technical Disclosure Bulletin, vol. 5, No. 7, p. 60, 1962.

JOHN H. MACK, *Primary Examiner.*

G. L. KAPLAN, *Assistant Examiner.*

U.S. Cl. X.R.

204—40, 43; 340—174